No. 608,190. Patented Aug. 2, 1898.
R. EDGAR, Jr.
MANU-PEDAL AND HAND STEERING VELOCIPEDE OR OTHER VEHICLE.
(Application filed Jan. 28, 1897.)
(No Model.) 4 Sheets—Sheet 1.
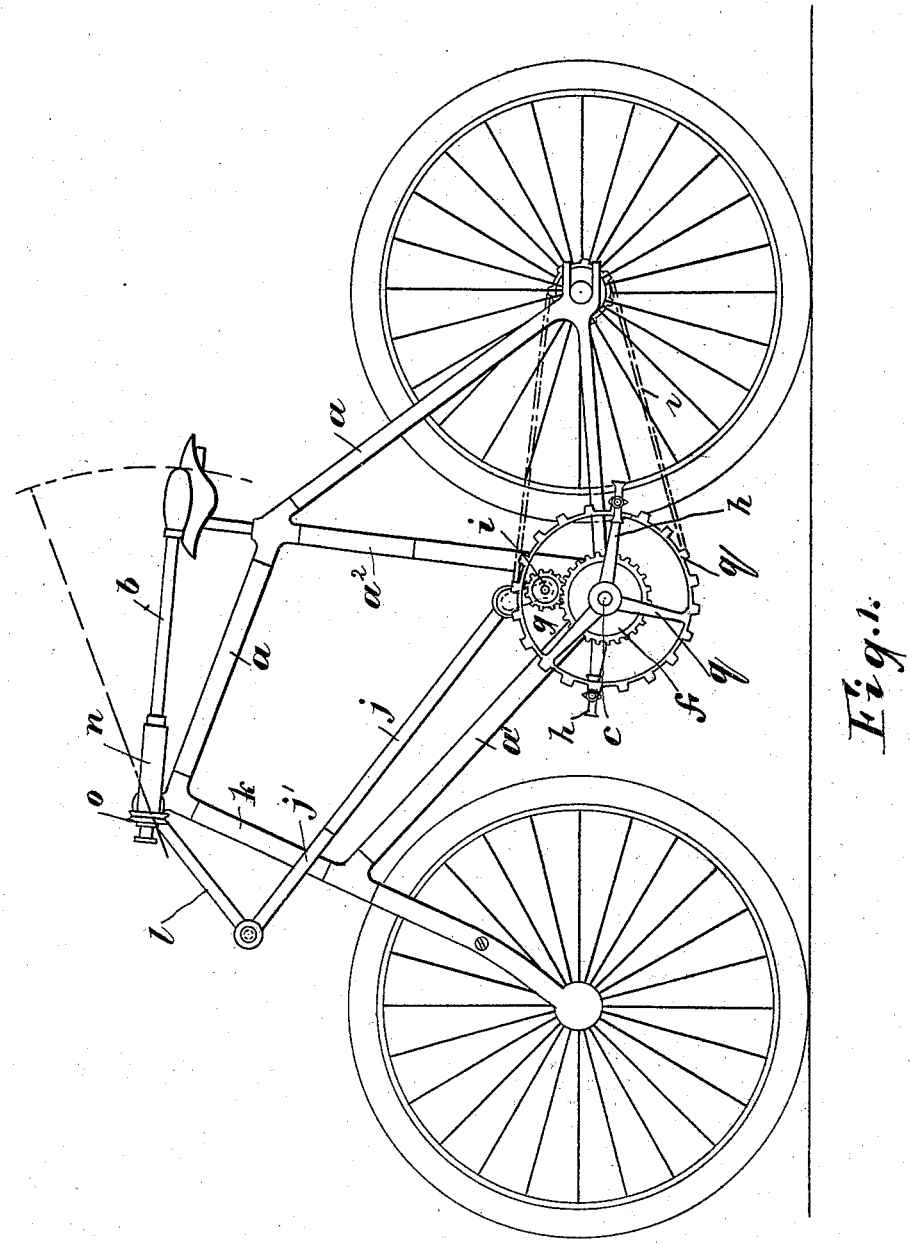
Witnesses:
W. C. Pinckney
C. Holloway
Inventor:
Robert Edgar Junior,
By J. E. M. Bowen
Attorney.

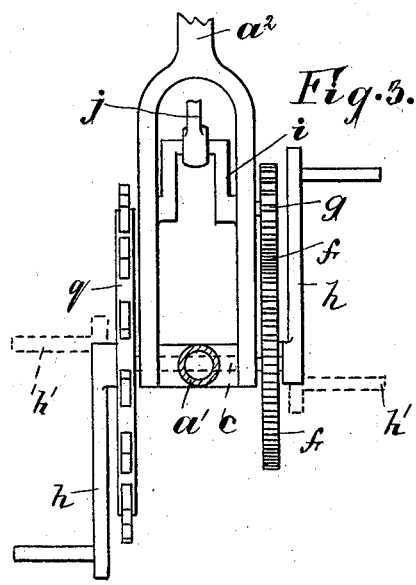
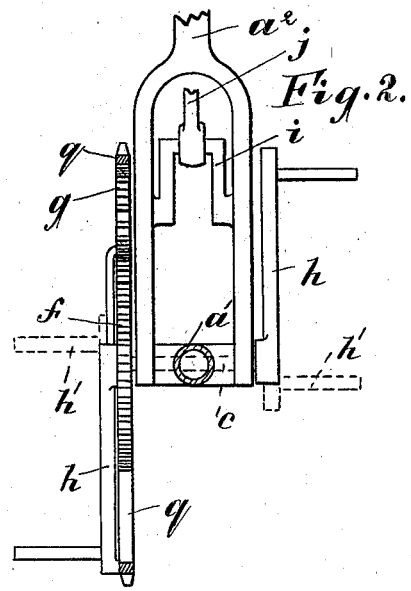
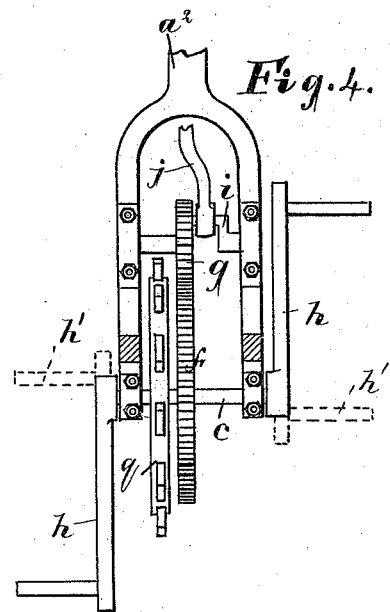
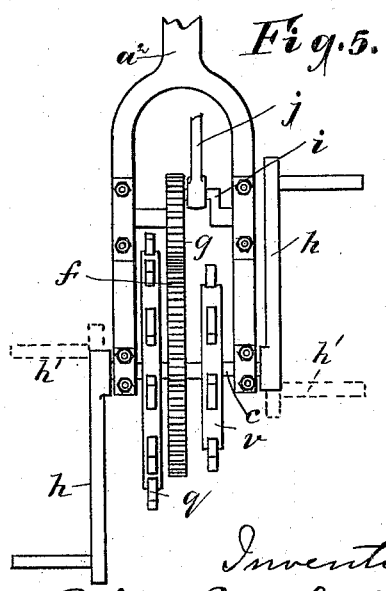

No. 608,190. Patented Aug. 2, 1898.
R. EDGAR, Jr.
MANU-PEDAL AND HAND STEERING VELOCIPEDE OR OTHER VEHICLE.
(Application filed Jan. 28, 1897.)
(No Model.) 4 Sheets—Sheet 3.
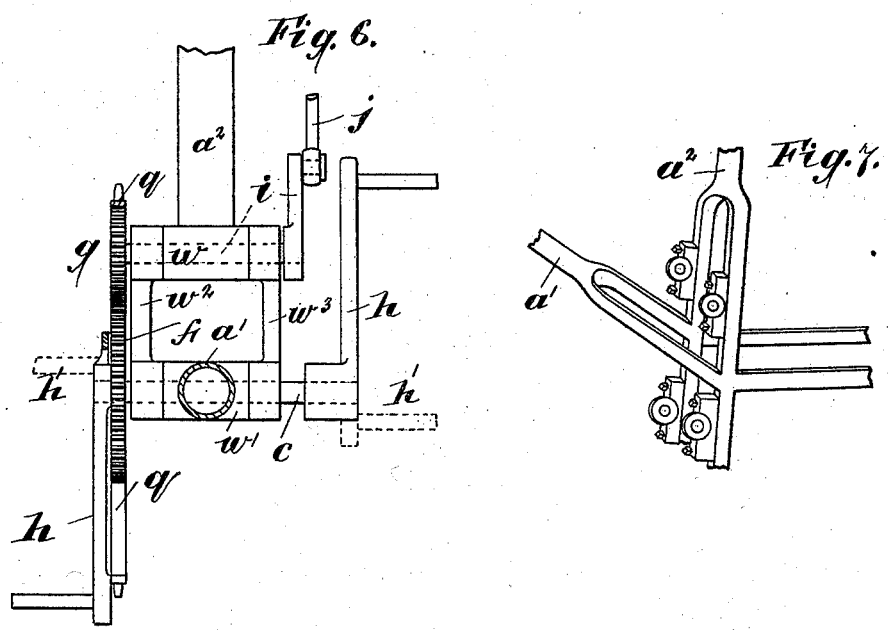
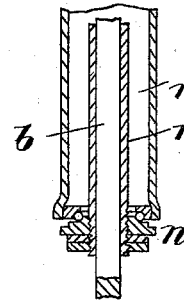
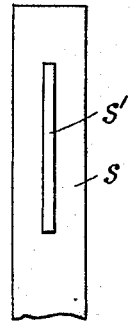
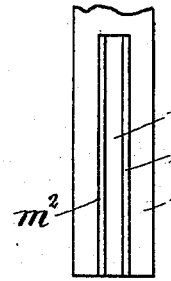
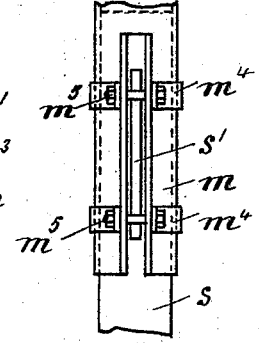
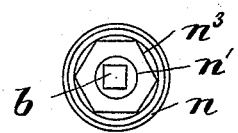
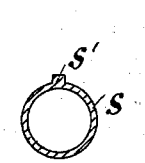
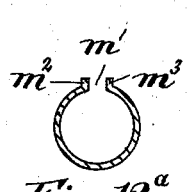
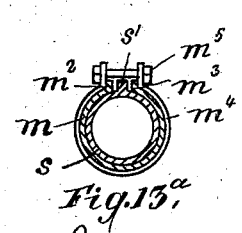

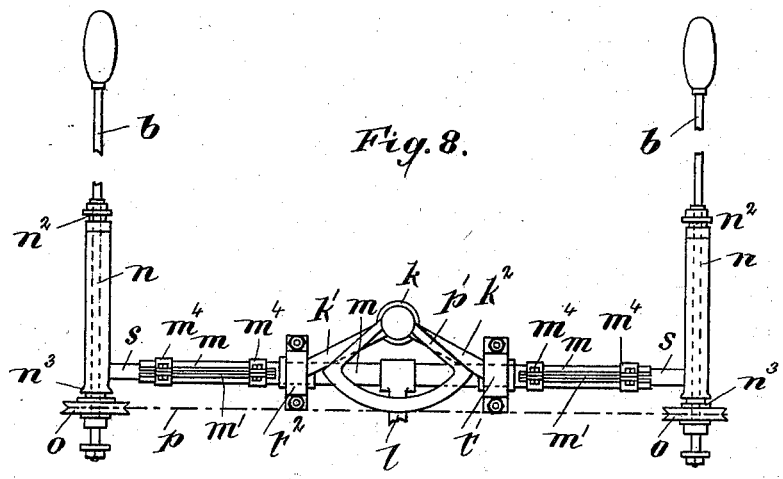
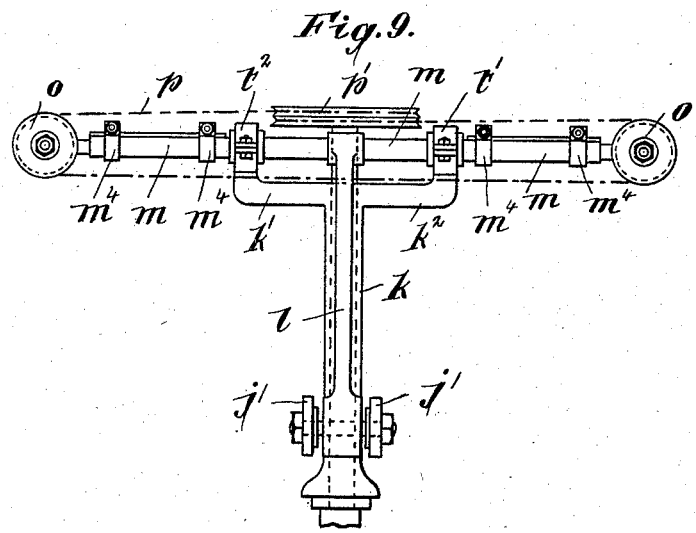

UNITED STATES PATENT OFFICE.

ROBERT EDGAR, JR., OF GLASGOW, SCOTLAND.

MANU-PEDAL AND HAND-STEERING VELOCIPEDE OR OTHER VEHICLE.

SPECIFICATION forming part of Letters Patent No. 608,190, dated August 2, 1898.

Application filed January 28, 1897. Serial No. 621,003. (No model.) Patented in England September 22, 1894, No. 18,021, and September 21, 1895, No. 17,649.

*To all whom it may concern:*

Be it known that I, ROBERT EDGAR, Jr., engineer, a subject of the Queen of Great Britain, and a resident of the city of Glasgow, Scotland, have invented certain new and useful Improvements in Manu-Pedal and Hand-Steering Velocipedes or other Vehicles, (patented in Great Britain September 21, 1895, No. 17,649, and September 22, 1894, No. 18,021,) of which the following is a specification.

This invention relates to all kinds of manu-pedal and hand-steering vehicles, whether for locomotion on land or water, such as velocipedes, cycle-cabs, and boats; and it has for its object to drive such vehicles or machines with greater power and at a greater speed than as heretofore effected by ordinary pedal or manu-pedal mechanism and also to provide means whereby the hand mechanism will be most efficient for propelling the vehicle when the pedal mechanism is the least so; and in order that my said invention may be properly understood I have hereunto appended four explanatory sheets of drawings, whereon—

Figure 1 is a view showing, by way of example, my invention applied to a bicycle. Fig. 2 is an enlarged front view of the gearing of the bicycle. Figs. 3, 4, and 5 show modifications of the gear. Figs. 6 and 7 show modified forms of bottom bracket. Fig. 8 is a plan, and Fig. 9 a front view, enlarged, of the steering mechanism. Figs. 10, 10ª, 11, 11ª, 12, 12ª, 13, and 13ª are enlarged detail views.

In this invention the hands as well as the feet are used in a novel manner to propel the vehicle, and the mechanism is so arranged that the hands have complete control over the steering of the machine, even when driving, without the necessity of letting go their hold in order to grasp any other form of steering-handle. Moreover, when the pedals are at their dead-points the hands are driving the machine.

The main principle on which the driving mechanism works is that the manual-levers or driving-handles move up and down radially through a vertical or nearly vertical arc simultaneously and not alternately, as do the pedals, and they are preferably arranged to have four such travels, two up and two down, for each complete revolution of the pedal crank-axle as compared with two travels, one up and one down, of the pedals. In other words, the manual crank-axle has two revolutions for each one of the pedal crank-axle, and each movement of the manual-levers, whether up or down, drives the machine.

The manual crank-axle is preferably geared by tooth or chain gearing with the crank-axle.

By making the manual-levers to work up and down simultaneously instead of alternately much greater power is obtained.

The manual-levers, besides having the propelling up and down movements, have also a rotating movement, a longitudinal movement, and a lateral movement. The rotating movement is for the purpose of effecting the steering of the machine, and in order to do this the hand-levers are carried in sleeves or brackets and are capable of being readily turned, so as to impart motion to toothed gearing, rods, levers, chains, and pulleys or equivalent mechanism connected with the steering-fork and thereby steer the machine. The longitudinal movement is for the purpose of increasing or decreasing the leverage of the hand-levers and is effected by sliding the levers in and out in their sleeves or brackets. The lateral movement is for the purpose of effecting a proper lateral adjustment to suit persons of different size and is effected by a telescopic movement or by turning the handles outward and inward on joints or pivots.

Referring to the drawings, $a$ is the cycle-frame; $b$, the manual or hand levers; $c$, the pedal-axle.

$f$ is a toothed wheel on the pedal-axle. (See also Fig. 2.)

$g$ is a pinion on the manual crank-axle.

$h$ are the pedal-cranks.

$i$ is the manual crank-axle, provided with a crank.

$j$ is a connecting-rod forked at $j'$ in order to pass by the pillar $k$.

$l$ is an arm fixed to the cross-shaft $m$.

$n$ are the manual-lever sleeves; $o$, the steering-pulleys; $p$, steering-chain; $q$, the chain-driving wheel, and $r$ the usual driving-chain. (Indicated by dotted lines, Fig. 1.)

In my present invention the manual or hand levers $b$, of which there are two, one at each side, are made by preference of square or oblong section and fit into round tubes $n'$, (see also Figs. 10 and $10^a$,) having square cores or passages through them for the reception of the levers. These tubes $n'$ are capable of revolving in ball-bearings $n^2 n^3$, provided at each end of the sleeves $n$. The levers $b$ are capable of sliding backward and forward in the tubes $n'$. Fitted at the front end of each tube $n'$ is a chain-pulley $o$, around which the steering-chain $p$ passes.

Each sleeve $n$ is provided with a laterally-projecting tubular arm $s$, (see also Figs. 11 and $11^a$,) which is provided with a raised feather $s'$ and fits telescopically into the hollow shaft $m$, carried in ball-bearings $t'$ $t^2$ on the forwardly-projecting branches $k'$ $k^2$ at the upper end of the pillar $k$. The ends of the shaft $m$ are, as shown in the enlarged views at Figs. 12 and $12^a$, slotted for a short distance at $m'$ and provided with thickened ribs or beadings $m^2$ $m^3$. These slots are for the reception of the feathers $s'$ of the arms $s$ of the sleeves. $m^4$, Figs. 13 and $13^a$, are metal straps secured on the outside of the shaft $m$ and provided with tightening-bolts $m^5$. With this arrangement lateral movement can be given to the sleeves $n$ and hand-levers $b$, so as to adjust them to suit persons of different size. To give the lateral adjustment, all that is necessary is to slacken the bolts $m^5$ and then push in or pull out the arms $s$ in the hollow shaft $m$. When the adjustment has been effected, the bolts $m^5$ are tightened up again.

The steering is effected by means of the chain $p$ and pulleys $o$ on the ends of the levers $b$. The chain is connected to the steering-quadrant $p'$, fitted on the upper end of the front fork of the bicycle. The steering is done by merely turning the manual-levers $b$, thereby causing the tubes $n'$ and chain-wheels $o$ to turn and in so doing to move the chain $p$ and steering-quadrant $p'$, fitted on the fork of the front wheel.

The arm $l$ of the cross-shaft $m$ is secured by ball-bearings to the fork $j'$ of the connecting-rod $j$, (see also Fig. 9,) which latter is also preferably secured by a ball-bearing to the manual crank-axle $i$. Instead of having the chain-wheel $q$ and chain $r$ on the opposite side to the gearing $f$ $g$, as usual, I prefer to arrange the chain-wheel as shown at Figs. 1 and 2. The wheel is secured to the pedal-axle and is made with, say, three spokes, one of which also forms the pedal-crank $h$, as shown clearly at Fig. 2. The rim of the wheel is made narrow and passes around the gear-wheels $f$ $g$ without touching them. The spokes are slightly bent where they are secured to the rim of the wheel $q$. Fig. 3 shows a form of gearing wherein the chain-wheel $q$ is at one side of the forked stay $a^2$ of the frame and the gear-wheels $f$ $g$ at the other.

Fig. 4 shows a form of gearing wherein the gear-wheels $f$ $g$ and chain-wheel $q$ are arranged within the fork of the stay $a^2$. In this case the wheels $q$ and $f$ are mounted on the pedal-axle just beside one another, and the pinion $g$ is made one with the manual crank-axle $i$. The connecting-rod $j$ in this case is slightly bent, as shown, to bring it into the center line of the fork of the stay $a^2$.

Fig. 5 shows a form of gearing whereby two speeds can be given. In this case the arrangement is similar to that at Fig. 4, with the exception that a small chain-wheel $v$ is also fitted on the pedal-axle. This arrangement is suitable for tricycles, cabs, cars, boats, &c. The two chains, one from each of the chain-wheels, drive two pinions running loose on a counter-shaft connected with and driving the wheels or propellers, as the case may be, of the cycle, boat, &c. These pinions are capable of being thrown into and out of gear, as desired, by means of a sliding or other clutch operated by a hand-lever on the counter-shaft. When the clutch is moved to one side, it throws one gear into operation, the other running loose, and when it is moved to the other side it throws the other gear into operation, the first one running loose. When the clutch is held in a mid-position, both gears run loose and the machine is at a standstill.

Fig. 6 shows an arrangement similar to Figs. 1 and 2, but the fork of the stay $a^2$ is of a different construction. $w$ is a hub or casing for the manual-axle $i$, while $w'$ is a hub or casing for the pedal-axle $c$. These two hubs or casings are connected together by castings or stampings $w^2$ $w^3$, which also are made with caps at their ends to inclose the ball-bearings of each axle. In this case the crank of the manual-axle is at one side, and the connecting-rod $j$ is a straight bar without a forked end led up by one side of the pillar $k$ and connected to the arm $l$, which is either bent or fitted slightly to one side of the center of the shaft $m$.

Fig. 7 shows a form of bottom bracket with bearings suitable for the gearing, as at Figs. 4 and 5.

In Figs 2 to 6 the dotted lines $h'$ indicate the exact position of the pedal-cranks for the forward movement, as at Fig. 1. As shown in full lines, the pedals are in position for backward movement.

If desired, the lateral movement of the hand-levers can be dispensed with, the sleeves $n$ being in this case connected direct with the hollow shaft $m$.

To properly operate the machine, the rider sits erect, like a soldier in the saddle, and works the hand-levers up and down simultaneously through a vertical arc or radially, as indicated in dotted lines at Fig. 1, at the same time operating the foot-pedals in the ordinary way—i. e., alternately up and down through a circular path. Every up-and-down movement of the hand-levers operates the sleeves $n$, shaft $m$, arm $l$, and connecting-rod $j$, thereby rotating the crank-axle $i$ and causing the pinion $g$ to turn the wheel $f$ and pedal-axle.

The parts are preferably so arranged relatively with each other when the cycle is going forward, as at Fig. 1, that when the pedal for the time being going down is at its greatest leverage the "manuals" or hand-levers are at their greatest leverage coming up, and when the pedals are at the top or bottom of their travels—that is, at the points of least leverage—the manuals are at their greatest leverage going down. The manuals, therefore, are arranged so as to have twice the number of travels as the pedals in the same time and permit the hand-levers to be in their most efficient positions for propelling the velocipede or other vehicle when the pedal-levers are in their least efficient propelling positions.

In applying the motive mechanism to different classes of machines—such as the motors of boats, &c.—it will in some cases, of course, be necessary to modify it, which can readily be done without departing from the invention.

Having now fully described my invention, what I claim, and desire to secure by Letters Patent, is—

1. In a vehicle such as described, the combination with the driving-shaft, of a gear secured to said shaft, a pinion of less diameter than said gear engaging with the same, a crank-shaft provided with a crank, and to which said pinion is secured, a radially-movable lever, and connections between the same and the crank, whereby the action of said lever in each direction will cause the pinion and gear and the pedal-shaft to revolve, and to drive the machine irrespective of the position of the pedals, and said lever adapted to be in its most efficient operative position, when the pedals are in their least efficient operative positions, substantially as set forth.

2. In a vehicle such as described, the combination with the pedals and pedal mechanism, of two horizontal hand-levers adapted to be moved up and down radially and simultaneously, means connecting said levers with the pedal mechanism, whereby the action of the hand-levers in each direction will operate the pedal to drive the machine irrespective of the positions of the pedals and adapted to make two movements to one movement of the pedals, substantially all as set forth.

3. In a vehicle such as described, the combination with the driving mechanism, a radially-movable lever having a horizontal shaft, and provided with two parallel sleeves extending laterally from said shaft, two handle-bars extending through said sleeves and rotatable therein, and said sleeves and bars having a radial movement, and means connecting said lever with the driving mechanism for operating the same, the steering device supported on the vehicle-frame, connected with the two handle-bars and adapted to be operated by the turning of said bars in their sleeves, substantially as set forth.

4. In combination, the frame of the machine, the pedal-shaft, alternately-acting pedals on the shaft, a gear-wheel $f$ on the pedal-shaft, a driving-wheel on the pedal-shaft, a crank-shaft $i$, a pinion $g$ on the crank-shaft meshing with the teeth of the gear-wheel $f$, a connecting-rod $j$, an arm $l$, a shaft $m$, sleeves $n$ secured to the shaft and hand-levers $b$ passed through the sleeves and capable of a longitudinal movement therein, substantially as set forth.

5. In combination, the frame of the machine, the pedal-shaft, alternately-acting pedals on the shaft, a gear-wheel $f$ on the pedal-shaft, a driving-wheel on the pedal-shaft, a crank-shaft $i$, a pinion $g$ on the crank-shaft meshing with the teeth of the gear-wheel $f$, a connecting-rod $j$, an arm $l$, a shaft $m$, sleeves $n$ secured to the shaft and hand-levers $b$ passed through the sleeves and capable of a longitudinal and rotary movement therein, and means connecting the handles with the steering device, whereby the turning of the handles will steer the machine, substantially as set forth.

6. In combination, the frame of the machine, the pedal-shaft, alternately-acting pedals on the shaft, a gear-wheel $f$ on the pedal-shaft, a driving-wheel on the pedal-shaft, a crank-shaft $i$, a pinion $g$ on the crank-shaft meshing with the teeth of the gear-wheel $f$, a connecting-rod $j$, an arm $l$, a shaft $m$, sleeves $n$ secured to the shaft, hand-levers $b$ passed through the sleeves and provided with pulleys $o$, chains passed round the pulleys and connected to a steering-quadrant $p'$ secured to the fork of the steering-wheel, substantially as set forth.

7. In combination, the frame of the machine, the pedal-shaft, alternately-acting pedals on the shaft, a gear-wheel $f$ on the pedal-shaft, a driving-wheel on the pedal-shaft, a crank-shaft $i$, a pinion $g$ on the crank-shaft meshing with the teeth of the gear-wheel $f$, a connecting-rod $j$, an arm $l$, a shaft $m$ split at its ends, sleeves $n$ provided with laterally-movable arms $s$ which fit telescopically into the split ends of the said shaft, hand-levers fitted in the sleeves $n$, and means for locking the arms $s$ to the shaft $m$, substantially as set forth.

Signed at Glasgow, Scotland, this 11th day of January, A. D. 1897.

ROBERT EDGAR, JUNIOR.

Witnesses:
H. D. FITZPATRICK,
F. CAMPBELL MACIVOR.